Oct. 12, 1937.     S. K. JENSEN     2,095,873
LIQUID SPRAY COOLING DEVICE
Filed July 27, 1934
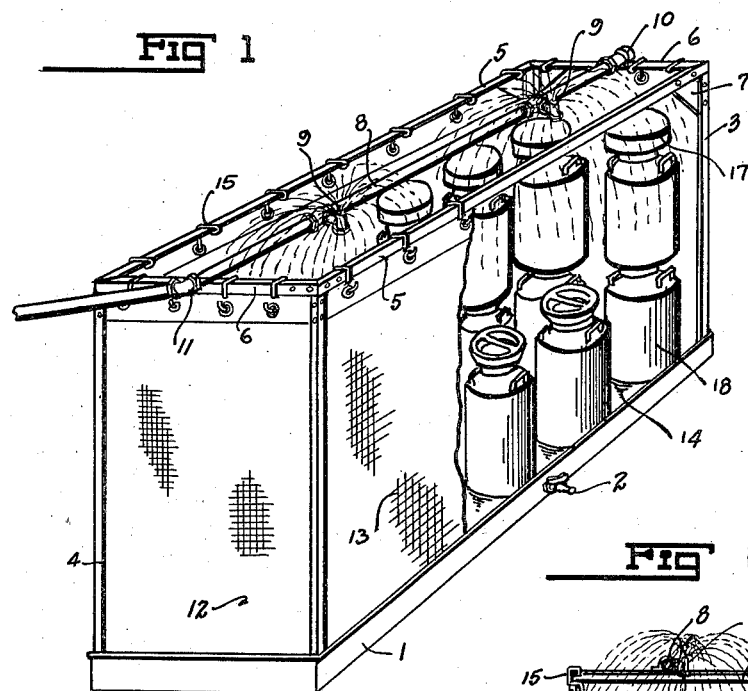
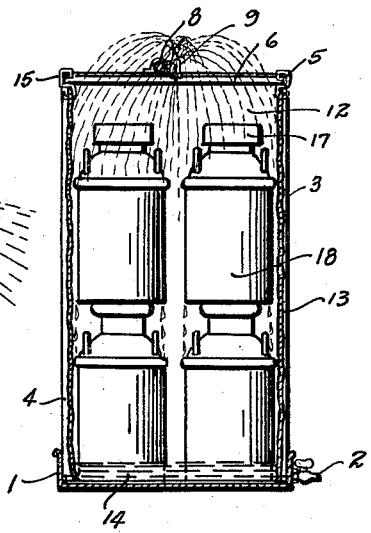
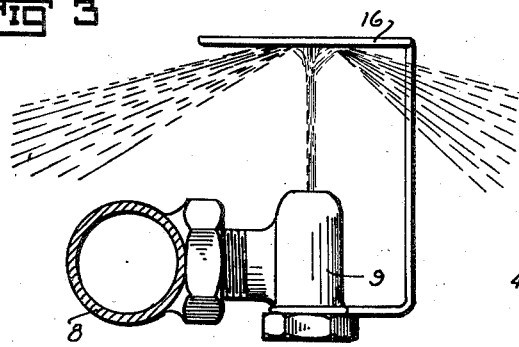
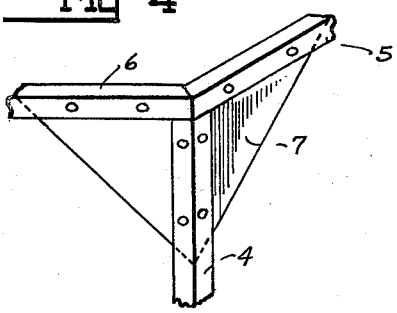
INVENTOR.
SOREN K. JENSEN
BY Charles R. Werner
ATTORNEY.

Patented Oct. 12, 1937

2,095,873

UNITED STATES PATENT OFFICE 2,095,873

LIQUID SPRAY COOLING DEVICE

Soren K. Jensen, Wichita, Kans.

Application July 27, 1934, Serial No. 737,225

1 Claim. (Cl. 45—132)

This invention relates to a liquid spray cooling device and particularly to an apparatus for cooling the contents of dairy products shipping containers.

At the present time, the shipping cans containing milk, cream or the like are collected at various stores or depots in rural districts and held until enough containers accumulate for a shipment. When the temperature is high and no means are provided for keeping the cans and their contents cool the result will be the souring of the milk or impairment of the flavor of sour cream or other contents of the cans. With the use of my device, however, an inexpensive means is provided for maintaining the contents of the cans at a considerably lower temperature than the atmospheric temperature.

The object of the invention, therefore, is to provide a cooling device using a liquid spray as a cooling medium, a tray in which shipping cans are stacked and a frame supporting a curtain of a porous and liquid absorbing material the bottom of which contacts the liquid in the tray, thereby moistening the entire curtain by absorption, the spray of water above the frame falling on the curtain and about the containers.

The source of liquid supply may be any suitable one such as a sink hydrant or the like, and since the spray is a very fine one, the amount of water used by the device will be slight and the cost of operating the cooler will be negligible compared to the resulting improvement in the quality and flavor of the milk, cream and the like.

The invention will be clearly understood by reference to the following description in connection with the accompanying drawing in which:

Figure 1 is a perspective view of the cooling device a portion of the curtain being removed to show the cans in position.

Figure 2 is a cross sectional view of the invention.

Figure 3 is an enlarged elevational view of the spray member with the addition of a liquid spreader above it.

Figure 4 is an enlarged fragmentary perspective view of one corner of the frame showing its detailed construction.

Referring now to the drawing by numerals of reference 1 designates a tray with an outlet 2. The frame 3 consists of uprights 4, longitudinal connecting members 5 and transverse members 6. A corner brace 7 is provided to which are suitably fastened the members 4, 5, and 6. Supported at the top of the frame and positioned longitudinally thereof is a conduit 8 having one or more spraying members 9. One end of the conduit 8 is closed as at 10 and the other end 11 is suitably connected to a source of liquid supply. Depending from members 5 and 6 are curtains 12 and 13, preferably made of burlap, although any suitable porous, liquid absorbing material may be used. The lower ends of the curtains rest in the tray 1 which contains liquid 14. The upper ends of the curtains are slidably carried on members 5 and 6 by means of hooks 15 or other suitable means.

In Figure 3 I have shown a spray device using a liquid spreader 16 above it, said member 16 being suitably mounted on the spray device 9 or on the conduit 8. Covers 17 are placed over the containers 18 to prevent liquid from entering therein.

In actual practice the shipping cans 18 are placed in the tray and may be stacked one on the other as shown. The curtains 12 and 13 are positioned on the frame 3 so that they completely envelop the cans, the bottoms of the curtains resting in the tray. The conduit 8 is connected to a suitable water supply, the water passing through said conduit and out through spray members 9, moistening the curtains and creating a mist about the cans. The curtains will also be moistened by absorbing water which collects in the tray. Outlet 2 provides means for emptying the tray 1 whenever desired.

From the foregoing it will be apparent that I have provided a novel, inexpensive and efficient means for cooling shipping cans and their contents during the period when the cans are being collected preparatory to shipping.

Slight changes in form, proportion and details of construction may be resorted to without departing from the spirit of my invention.

What I claim as new and desire to secure by Letters Patent is:

A liquid spray cooling device comprising a tray for holding containers and the like, a frame having standards resting in the tray, a curtain covering the sides of the frame to envelop the containers, the top of the frame being left open, the bottom of the curtain resting in the tray and the top of the curtain being slidably supported by the frame, a plurality of liquid spray devices supported by the frame above the open top thereof and adapted to direct a liquid on the inside surface of the curtain to moisten the curtain and the containers in the tray.

SOREN K. JENSEN.